United States Patent [19]
Fabro et al.

[11] Patent Number: 5,967,527
[45] Date of Patent: Oct. 19, 1999

[54] SEALING ASSEMBLY FOR A MOVING MECHANICAL MEMBER, IN PARTICULAR A ROTARY SHAFT OF A HYDRAULIC PUMP

[75] Inventors: Roberto Fabro, Turin, Italy; Mikael Josefsson, Forsheda, Sweden; Peter Koski, Turin, Italy

[73] Assignee: Forsheda AB, Forsheda, Sweden

[21] Appl. No.: 08/966,924

[22] Filed: Nov. 10, 1997

[30] Foreign Application Priority Data

Nov. 19, 1996 [IT] Italy .................................. TO96A0933

[51] Int. Cl.[6] ...................................................... F16J 15/32
[52] U.S. Cl. ........................... 277/560; 277/561; 277/565
[58] Field of Search .................................... 277/549, 560, 277/561, 562, 565, 573

[56] References Cited

U.S. PATENT DOCUMENTS 3,005,648  10/1961  Christensen .............................. 277/560
4,531,747   7/1985  Miura ....................................... 277/573

*Primary Examiner*—Chuck Y. Mah
*Assistant Examiner*—Alison K. Pickard
*Attorney, Agent, or Firm*—Baker & Daniels

[57] ABSTRACT

A sealing assembly (1) for a rotary shaft (2), having a metal structure (4) defined by a sleeve portion (6) and by a radially inner flange (7), and a sealing ring (5) cooperating in sliding manner with the shaft (2); the sealing ring (5) in turn has a connecting portion (15) for connection to the flange (7), and a portion (18) projecting from the flange; two sealing lips (19, 20) extend axially from opposite sides of the projecting portion (18); the two sealing lips (19, 20) and the projecting portion (18) are connected in one piece to one another at respective narrow sections (21, 22, 23), each defining a respective virtual hinge permitting rotation of each element with respect to the others; and the respective centers of rotation (A, B, C) of the virtual hinges are defined, at each axial section of the sealing assembly, by three points arranged substantially in the form of a triangle.

14 Claims, 2 Drawing Sheets

SEALING ASSEMBLY FOR A MOVING MECHANICAL MEMBER, IN PARTICULAR A ROTARY SHAFT OF A HYDRAULIC PUMP

BACKGROUND OF THE INVENTION

The present invention relates to a sealing assembly for a moving mechanical member, in particular a rotary shaft of a hydraulic pump, and which is suitable for use at both high and low external temperatures, and especially in the presence of wide angles of displacement of the shaft and in the presence of friction bearings.

Various types of seals for sealing the power takeoff side of hydraulic pumps are known, and which are inserted between the rotary shaft and the bearing to separate the incoming fluid from the outside environment, e.g. the compartment of a vehicle engine or any other sort of power generating unit.

In particular, double-lip sealing assemblies are known in which a first or so-called "dust cover" lip—mainly for protection against external agents—is fitted on the air (outer) side, and a second lip—which performs the actual sealing function—is fitted on the fluid (inner) side.

Currently marketed multiple-lip seals, however, involve several drawbacks.

Firstly, such seals fail to allow, with no loss in sealing performance, for the adaptation of wide angles of displacement of the shaft rotation axis, as in increasingly common applications in which conventional rolling bearings are replaced by friction bushes to permit considerable radial slack.

Secondly, such seals adapt poorly to changing operating conditions: as is known, sealing performance is affected both by the temperature and pressure of the fluid in the pump circuit, and by the environment, particularly the outside temperature.

The conditions in which seals are called upon to operate may therefore differ widely. For example, overpressure of the operating fluid may occur, thus resulting in compression of the sealing lips towards the air side, and in a so-called "extrusion" effect capable of detaching the dust cover lip.

On the other hand, negative pressure of the incoming fluid, caused, for example, by low outside temperature, may raise the viscosity of the fluid, which therefore requires a considerable amount of energy for its movement, generates intake resistance, and, along considerable portions of the pump-tank conduits, produces low-pressure states in the pump in proportion to the fall in temperature of the fluid.

Consequently, when turned on, the pump tends to reduce the pressure on the fluid side of the shaft seal, and attempts to draw in air through the main sealing lip, which therefore tends to lift.

One known solution to at least partly eliminate the above drawback is to design the dust cover lip to also act as an air valve, which closes when the low-pressure state extends from the fluid side to a cavity specially formed between the two lips.

This solution, however, is only effective at low temperature when the seal is made of low-glass-transition-temperature rubber (e.g. silicone or nitrile rubber), which, on the other hand, does not normally conform with requirements in terms of wear resistance, fluid compatibility and resistance to high temperatures.

In other words, a compromise is inevitably sought between the chemical and physical characteristics of the elastomeric material used, and the construction design of the seal, both of which, however, invariably limit the performance of the seal to some extent.

It is an object of the present invention to provide a sealing assembly for rotary shafts, designed to overcome the aforementioned drawbacks typically associated with known seals. More specifically, it is an object of the present invention to provide a sealing assembly capable of maintaining a high degree of efficiency even in the presence of wide angles of displacement of the shaft, and which is equally effective at high and low operating temperatures using low-glass transition-temperature elastomeric materials.

SUMMARY OF THE INVENTION

According to the present invention, there is provided a sealing assembly for a moving mechanical member, in particular a rotary shaft of a hydraulic pump, comprising a metal structure defined by a sleeve portion and by a radial flange, and a sealing ring cooperating in sliding manner with said moving mechanical member; characterized in that said sealing ring comprises an annular portion projecting from a first face of said flange; a first annular sealing lip extending axially from said projecting portion, on the same side as said first face of the flange; and a second annular sealing lip extending from said projecting portion on the opposite side to said first lip; said first and second sealing lips and said projecting portion being connected in one piece to one another at respective narrow sections defining virtual hinges permitting elastic deformation of each lip with respect to the others, and permitting rotation of said first and second sealing lips and said projecting portion about respective centers of rotation; said centers of rotation being defined, at each axial section of said sealing assembly, by three nonaligned points.

Said three nonaligned points are arranged, in radial section, in the form of a triangle; and said narrow sections are all located on the same side of said flange, in particular, to the side of said first face of the flange.

At least part of said second sealing lip preferably extends axially beyond said flange.

According to a preferred embodiment, the sealing assembly according to the invention also comprises stop means for limiting the amount of rotation of said second sealing lip.

More specifically, said stop means comprise a first annular element on said second sealing lip, and a second annular element on said metal structure; said first and second annular elements facing each other and being separated by an annular gap.

The sealing assembly according to the present invention is therefore capable of adapting easily, and with loss in efficiency, to wide angles of displacement of the shaft, and to changing internal and external operating conditions. That is, the "virtual hinge" system defined by the particular geometric design of the invention enables the two sealing lips to deform elastically with respect to each other and the rest of the seal, to ensure a high degree of efficiency in hot and cold temperatures and in the presence of severe tilting of the axis of rotation of the shaft.

In particular, the efficiency of the sealing assembly according to the invention remains unimpaired in the event of overpressure on the fluid side, by preventing detachment and "extrusion" of the sealing lips, and also in the event of low pressure operation of the pump, by preventing both outflow of the fluid and air intake resulting in cavitation.

BRIEF DESCRIPTION OF THE DRAWINGS

A number of non-limiting embodiments of the present invention will be described by way of example with reference to the accompanying drawings, in which.

DESCRIPTION OF THE PRESENT INVENTION

Figure 1:
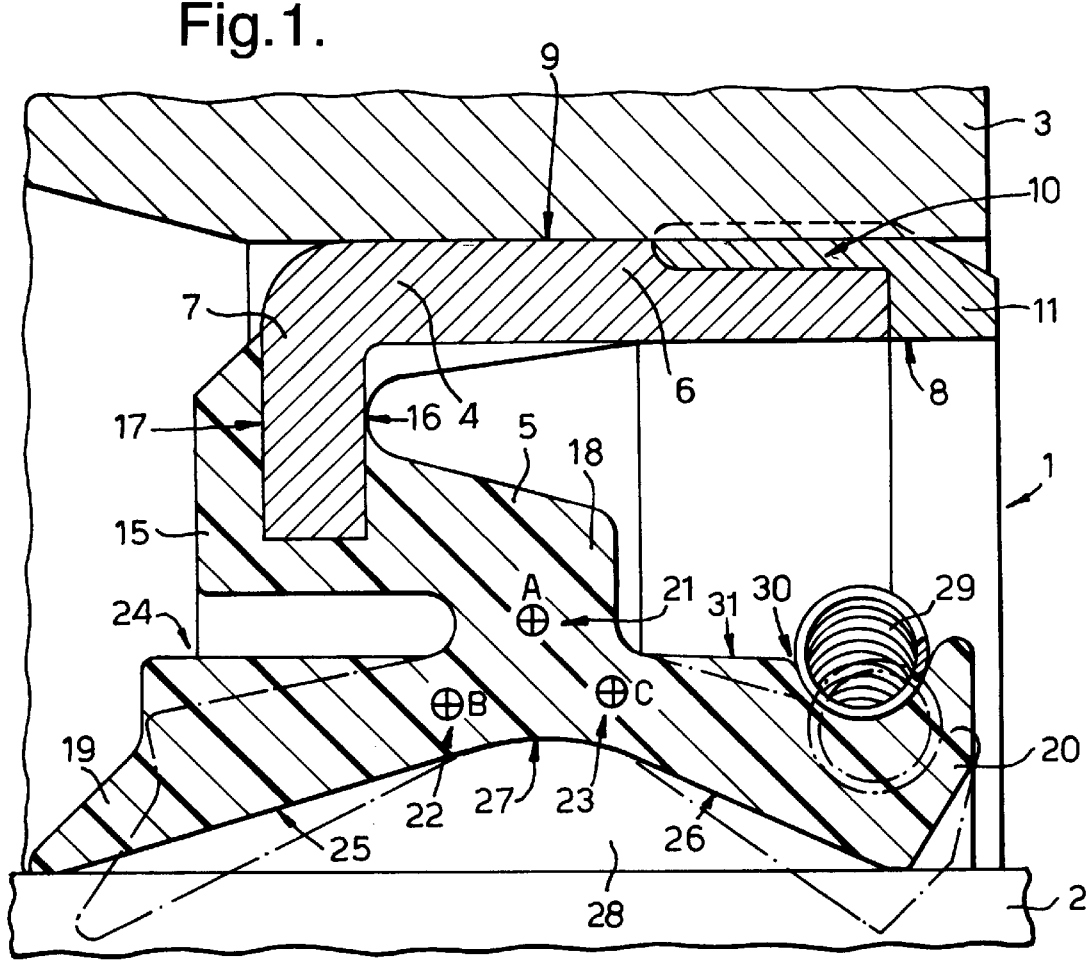
FIG. 1 shows a section of a radial sealing assembly for a rotary shaft in accordance with the present invention.

Number 1 in FIG. 1 indicates a radial sealing assembly for a rotary shaft 2 of a hydraulic pump, and which is housed inside a seat 3, e.g. a known sliding bush seat.

Sealing assembly 1 comprises a metal structure 4, and a sealing ring 5 made of elastomeric material.

Metal structure 4 in turn comprises a sleeve portion 6 and a radially inner flange 7 connected to each other in one piece. On its radially outer lateral surface 9, and at the opposite end 8 to flange 7, sleeve portion 6 comprises a seat 10 for housing a cover 11, which is made of elastomeric material, projects partly beyond end 8, forms an extension of sleeve portion 6, and cooperates in known manner with metal structure 4 to seal the wall of seat 3.

Sealing ring 5 of elastomeric material is fixed in known manner (e.g. bonded or molded) to flange 7 by a connecting portion 15 shaped to extend at least partly along the face 16 of flange 7 facing sleeve portion 6, and along a face 17 opposite face 16. As explained in more detail later on, in the example shown, sealing assembly 1 is fitted so that, in use, face 16 of flange 7 faces inwards of the pump, i.e. on the "fluid side", while face 17 faces outwards, i.e. on the "air side."

Sealing ring 5 also comprises a portion 18 extending from connecting portion 15 and projecting from the face 16 side of flange 7 (i.e. inwards of sleeve portion 6); and two sealing lips 19 and 20 connected integrally to projecting portion 18. A first sealing lip 19 extends axially towards the air side, and mainly acts as a dust cover; and a second sealing lip 20 extends axially on the opposite, i.e. fluid, side.

Projecting portion 18 and sealing lips 19, 20 are arranged substantially in the form of a "star", and are connected integrally to one another at respective narrow sections 21, 22, 23 defining respective virtual hinges indicated schematically by points A, B, C, and which permit each of elements 18, 19, 20 to rotate with respect to the others about respective nonaligned centers of rotation A, B, C.

The virtual hinges defined in radial section by points A, B, C are arranged in the form of a triangle; and narrow sections 21, 22, 23 are all located on the same side of flange 7, namely on the face 16 side of the flange.

The first lip or dust cover 19 is of substantially known design, but is roughly twice the axial length of conventional seals, and extends axially beyond flange 7 on the air side.

A radially outer lateral surface 24 of lip 19 is positioned facing and a small distance from connecting portion 15; and a radially inner lateral surface 25 of lip 19 is connected to a radially inner lateral surface 26 of lip 20 to define a concave surface 27, the concavity of which faces shaft 2 and defines a cavity 28 between shaft 2 and lips 19, 20.

The second lip 20 comprises a known spring 29 housed inside an annular seat 30 formed in the radially outer lateral surface 31 of lip 20.

In actual use, sealing assembly 1 is fitted in known manner inside seat 3 with, as stated, first lip 19 on the air side, where it functions mainly as a dust cover, and with second lip 20 on the fluid side, i.e. inwards with respect to the air side, where it performs the actual fluid sealing function.

More specifically, first lip 19 provides for preventing other fluids and/or dirt from damaging second lip 20, which function is ensured at assembly by the radial interference pressure produced by the elastic reaction of lip 19, which, in the undeformed shape, is as shown by the thin line in FIG. 1.

Second lip 20, on the other hand, is pressed onto shaft 2 by the radial pressure produced, not only by a certain amount of interference at assembly, but also and especially by spring 29, which provides for maintaining contact between lip 20 and shaft 2 under any temperature, pressure and static/dynamic displacement conditions of the shaft.

Figure 2:
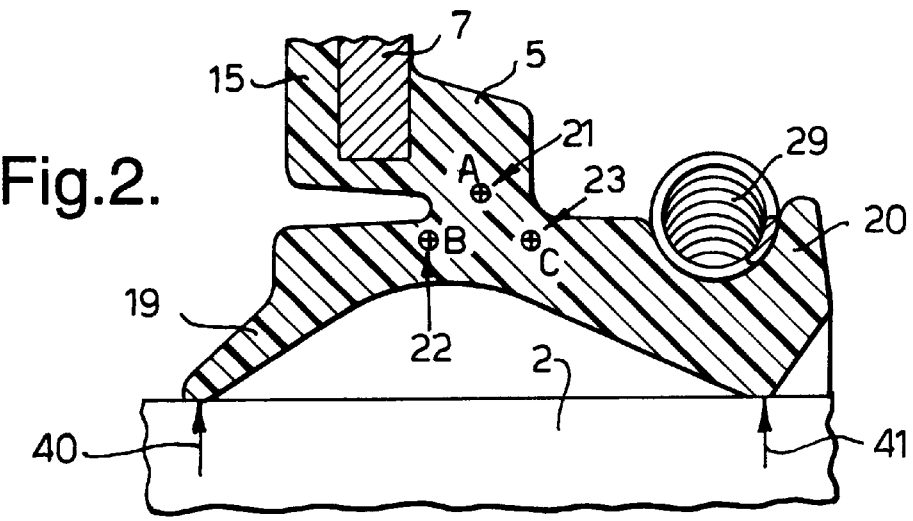
FIGS. 2, 3 and 4 show a detail of the FIG. 1 sealing assembly in different operating conditions.

Under normal operating conditions, as shown in FIG. 2, sealing assembly 1 is subjected to substantially radial pressures 40 and 41 on lips 19 and 20 respectively; and, even in the event of severe displacement of shaft 2 unbalancing pressures 40 and 41, the virtual hinge defined by narrow section 21 balances the thrust on lips 19 and 20, thus enabling the seal to adapt to deformation with no impairment in sealing efficiency. Lips 19 and 20 are deformable independently to follow any displacement of shaft 2, and so remain permanently contacting shaft 2 to prevent fluid leakage.

Figure 3:
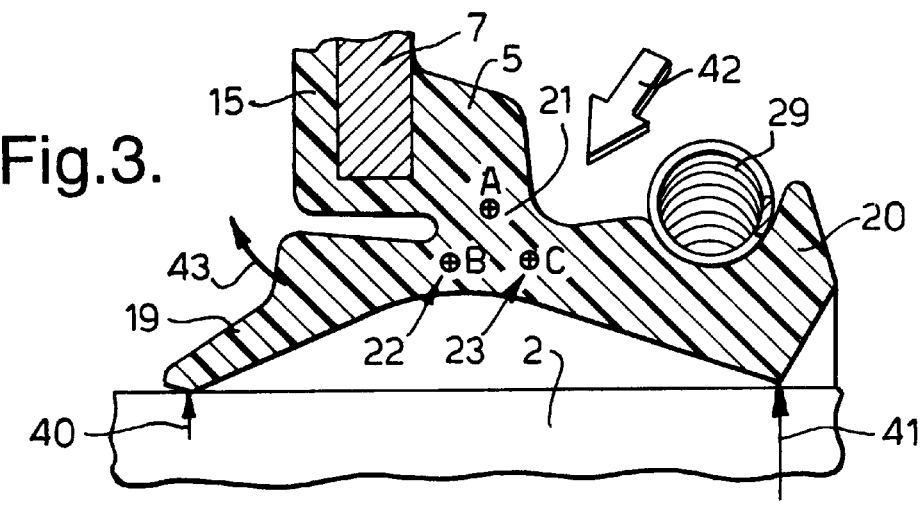

FIG. 3 shows the performance of sealing assembly 1 in the event of overpressure on the fluid side.

In this case, sealing assembly 1 is subjected to a positive pressure 42 by the incoming fluid, which tends to unbalance radial pressures 40, 41 on respective lips 19, 20, thus resulting in a bending moment 43 which, if not prevented, could result in detachment of lip 19 from shaft 2, and in extrusion of lip 20.

According to the invention, however, any lifting of lip 19 is limited by connecting portion 15. As stated, the portion of connecting portion 15 covering flange 7 is located facing and a small distance from outer surface 24 of lip 19, and therefore provides for limiting rotation of lip 19 about the hinge defined by narrow section 22, and so preventing detachment of lip 19 and extrusion of sealing lip 20. Moreover, the hinges defined by narrow sections 22, 23 enable lips 19, 20 to rotate partly about points B and C and so absorb part of the overpressure induced by extrusion.

Figure 4:
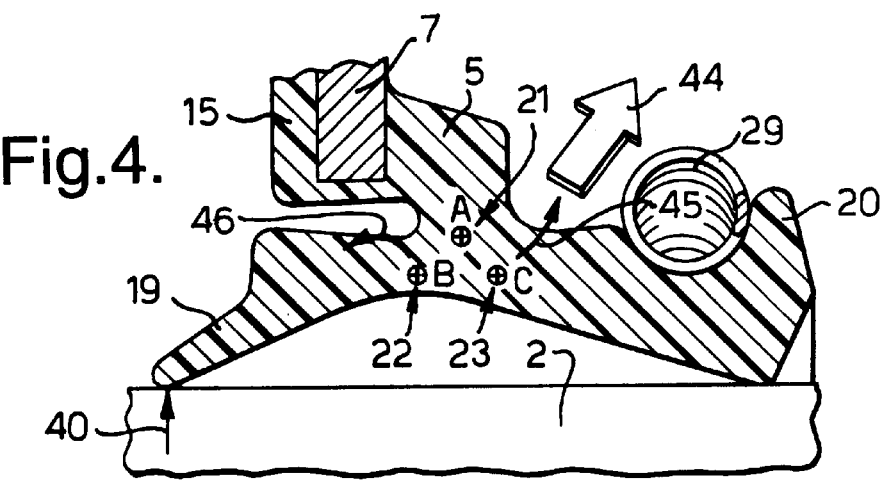

FIG. 4 shows the performance of sealing assembly 1 in the event of low pressure on the fluid side, as, for example, when the pump is started after prolonged exposure to low external temperature.

In this case, sealing assembly 1 is subjected to a negative pressure 44 resulting in a bending moment 45, which tends to lift sealing lip 20 to draw in outside air.

According to the invention, however, lip 19 acts as an outside air valve, which closes when the low-pressure state extends from inside the pump to the gap 28 between lips 19 and 20.

In other words, the virtual hinges defined by sections 22, 23 between lips 19, 20 and projecting portion 18 transfer the opening moment 45 on lip 20 onto lip 19, so that the transferred moment 46 is applied entirely on the sealing region between lip 19 and shaft 2, thus increasing radial pressure 40.

Moreover, as stated, lip 19 is of more than normal axial length (roughly twice the length of dust cover lips of currently used seals), so that it is more flexible and exerts far greater radial pressure on the sealing region than would be possible with a shorter profile. As such, even if the outside temperature is close to the glass-transition temperature of the elastomeric material employed (thus resulting in a substantial increase in rigidity), lip 19 is still capable of compensating any static and/or dynamic eccentricity of the parts involved.

Figure 5:
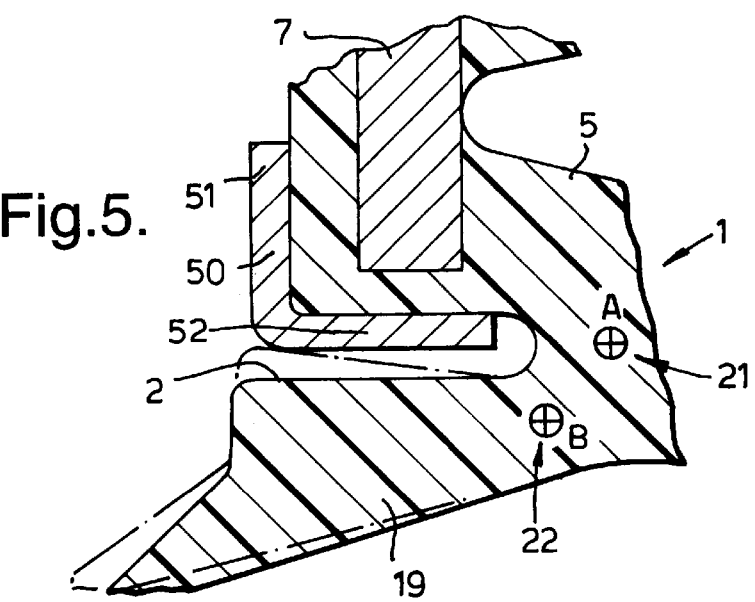
FIG. 5 shows a section of a possible variation of the FIG. 1 sealing assembly.

FIG. 5 shows a possible variation 1a of the sealing assembly according to the invention, in which any details similar or identical to those already described are indicated using the same numbering system.

Like sealing assembly 1, sealing assembly 1a comprises a metal structure 4 and a sealing ring 5, both as described above.

Flange 7 of structure 4 is covered by connecting portion 15 of sealing ring 5, and is fitted with a further rigid, preferably metal, annular element 50 shaped to reproduce the profile of flange 7 and therefore comprising a sleeve portion 52 and a radially outer flange portion 51. Flange portion 51 is substantially parallel to flange 7; and sleeve portion 52 is substantially parallel to surface of portion 15 facing the radially outer lateral surface 24 of lip 19, to which surface of portion 15 may be bonded or otherwise fixed. Sleeve portion 52 is of a thickness smaller than the radial distance between surface 24 and structure 4, but further anticipates contact between lip 19 and the rigid body of the sealing assembly in the event of rotation of lip 19 about point B in the presence, as described, of positive overpressure of the incoming fluid.

Clearly, changes may be made to the sealing assembly as described and illustrated herein without, however, departing from the scope of the accompanying claims.

We claim:

1. A sealing assembly of a moving mechanical member, in particular a rotary shaft of a hydraulic pump, comprising a metal structure defined by a sleeve portion and by a radial flange, and a sealing ring adapted for cooperating in sliding manner with a moving mechanical member; characterized in that said sealing ring comprises an annular portion projecting from a first face of said flange; a first annular sealing lip extending from said annular portion on the opposite side of said annular portion as said first face of said flange; a second annular sealing lip extending axially from said annular portion on the same side of said annular portion as said first face of said flange; said first and second sealing lips and said annular portion being connected in one piece to one another at respective narrow sections defining virtual hinges permitting elastic deformation of each said lip, and permitting rotation of said first and second sealing lips and said annular portion about respective centers of rotation; said centers of rotation being defined, at each axial section of said sealing assembly, by three nonaligned points; and stop means for limiting the amount of rotation of said first sealing lip, said stop means comprising a first annular element on said first sealing lip and a second annular element on said metal structure, said first and second annular elements facing each other and being separated by an annular gap.

2. A sealing assembly as claimed in claim 1, characterized in that said three nonaligned points are arranged, in radial section, in the form of a triangle.

3. A sealing assembly as claimed in claim 2, characterized in that said narrow sections are all located on the same side of said flange.

4. A sealing assembly as claimed in claim 2, characterized in that said sealing ring also comprises a connecting portion for connection to said metal structure and extending at least partly along said first face of said flange and at least partly along a second face of said flange opposite said first face of said flange.

5. A sealing assembly as claimed in claim 1, characterized in that said narrow sections are all located on the same side of said flange.

6. A sealing assembly as claimed in claim 5, characterized in that said narrow sections are all located on the side of said first face of said flange.

7. A sealing assembly as claimed in claim 6, characterized in that said sealing ring also comprises a connecting portion for connection to said metal structure and extending at least partly along said first face of said flange and at least partly along a second face of said flange opposite said first face of said flange.

8. A sealing assembly as claimed in claim 5, characterized in that said narrow sections are all located on the side of said first face of said flange.

9. A sealing assembly as claimed in claim 8, characterized in that said sealing ring also comprises a connecting portion for connection to said metal structure and extending at least partly along said first face of said flange and at least partly along a second face of said flange opposite said first face of said flange.

10. A sealing assembly as claimed in claim 5, characterized in that said sealing ring also comprises a connecting portion for connection to said metal structure and extending at least partly along said first face of said flange and at least partly along a second face of said flange opposite said first face of said flange.

11. A sealing assembly as claimed in claim 1, characterized in that said sealing ring also comprises a connecting portion for connection to said metal structure and extending at least partly along said first face of said flange and at least partly along a second face of said flange opposite said first face of said flange.

12. A sealing assembly as claimed in claim 1, characterized in that at least part of said first sealing lip extends axially beyond said flange.

13. A sealing assembly as claimed in claim 1, characterized in that said stop means also comprise a third metal annular element fitted to said flange; said third metal annular element comprising at least a cylindrical portion; and a lateral surface of said cylindrical portion being positioned substantially facing said first annular element on said first sealing lip.

14. A sealing assembly as claimed in claim 1, characterized by also comprising a ring of elastomeric material extending at least partly along a lateral surface of said sleeve portion of said metal structure.

* * * * *